(12) United States Patent
Howard et al.

(10) Patent No.: US 6,954,850 B1
(45) Date of Patent: *Oct. 11, 2005

(54) ELECTRONIC DEVICE THAT USES A PAGER NETWORK FOR REMOTE REPROGRAMMING OF THE DEVICE

(75) Inventors: Michael L. Howard, Sandy, UT (US); William R. Harper, Jr., Salt Lake City, UT (US)

(73) Assignee: Matsushita Electric Works, Ltd., Osaka (JP)

( * ) Notice: Subject to any disclaimer, the term of this patent is extended or adjusted under 35 U.S.C. 154(b) by 556 days.

This patent is subject to a terminal disclaimer.

(21) Appl. No.: 09/699,693

(22) Filed: Oct. 30, 2000

(51) Int. Cl.[7] .............................................. G06F 9/00
(52) U.S. Cl. .................... 713/1; 713/1; 713/2; 370/277; 370/310; 370/913; 375/219; 375/220; 455/426.01; 705/18; 705/26
(58) Field of Search ............................... 713/1, 2, 100, 713/151, 200; 379/88.15, 114.03, 914; 380/241, 380/271; 700/275–278, 300; 370/277, 310, 370/90; 375/219, 220; 455/426.01; 705/18, 705/26

(56) References Cited

U.S. PATENT DOCUMENTS

| | | | | |
|---|---|---|---|---|
| 5,623,256 A | * | 4/1997 | Marcoux | 340/825.69 |
| 5,737,707 A | * | 4/1998 | Gaulke et al. | 455/556.1 |
| 5,787,288 A | | 7/1998 | Nagata et al. | 717/11 |
| 5,822,692 A | | 10/1998 | Krishan et al. | 455/419 |
| 5,854,984 A | | 12/1998 | Buhrmann et al. | 455/550 |
| 5,883,886 A | | 3/1999 | Eaton et al. | 370/314 |
| 5,923,761 A | * | 7/1999 | Lodenius | 455/73 |
| 5,937,198 A | | 8/1999 | Nelson et al. | 717/11 |
| 5,959,869 A | * | 9/1999 | Miller et al. | 700/231 |
| 5,983,074 A | | 11/1999 | Jansen | 455/31.3 |
| 6,028,506 A | | 2/2000 | Xiao | 340/426 |
| 6,058,104 A | | 5/2000 | Snelling et al. | 370/277 |
| 6,076,099 A | * | 6/2000 | Chen et al. | 709/202 |
| 6,131,040 A | | 10/2000 | Knuutila et al. | 455/550 |
| 6,151,657 A | * | 11/2000 | Sun et al. | 711/103 |
| 6,301,709 B1 | * | 10/2001 | Warmink | 713/1 |
| 6,308,230 B1 | * | 10/2001 | Potter et al. | 710/64 |
| 6,560,456 B1 | * | 5/2003 | Lohtia et al. | 455/445 |
| 6,577,229 B1 | * | 6/2003 | Bonneau et al. | 340/10.41 |
| 6,615,038 B1 | * | 9/2003 | Moles et al. | 455/418 |
| 6,622,246 B1 | * | 9/2003 | Biondi | 713/100 |
| 6,631,520 B1 | * | 10/2003 | Theron et al. | 717/173 |
| 6,665,384 B2 | * | 12/2003 | Daum et al. | 379/102.03 |
| 6,708,045 B1 | * | 3/2004 | Lieu et al. | 455/557 |
| 2001/0041943 A1 | * | 11/2001 | Tang et al. | 700/2 |
| 2002/0032470 A1 | * | 3/2002 | Linberg | 607/60 |

FOREIGN PATENT DOCUMENTS

WO WO-00/17749 * 3/2000 ............ G06F 9/445

* cited by examiner

Primary Examiner—Lynne H. Browne
Assistant Examiner—Nitin C. Patel
(74) Attorney, Agent, or Firm—Madson & Metcalf

(57) ABSTRACT

A portable electronic device is disclosed that is reprogrammable through a pager network. The device includes a communications port. The device also includes a data transceiver for transmitting send data and receiving receive data from a pager network. In addition, the device has a processor. The processor is in electronic communication with the communications port for communicating through the communications port. The processor is also in electronic communication with the data transceiver for communications with the pager network. The device also includes reprogrammable memory programmed with instructions to cause the device to receive new program code from the pager network and to reprogram the reprogrammable memory with the new program code.

20 Claims, 11 Drawing Sheets

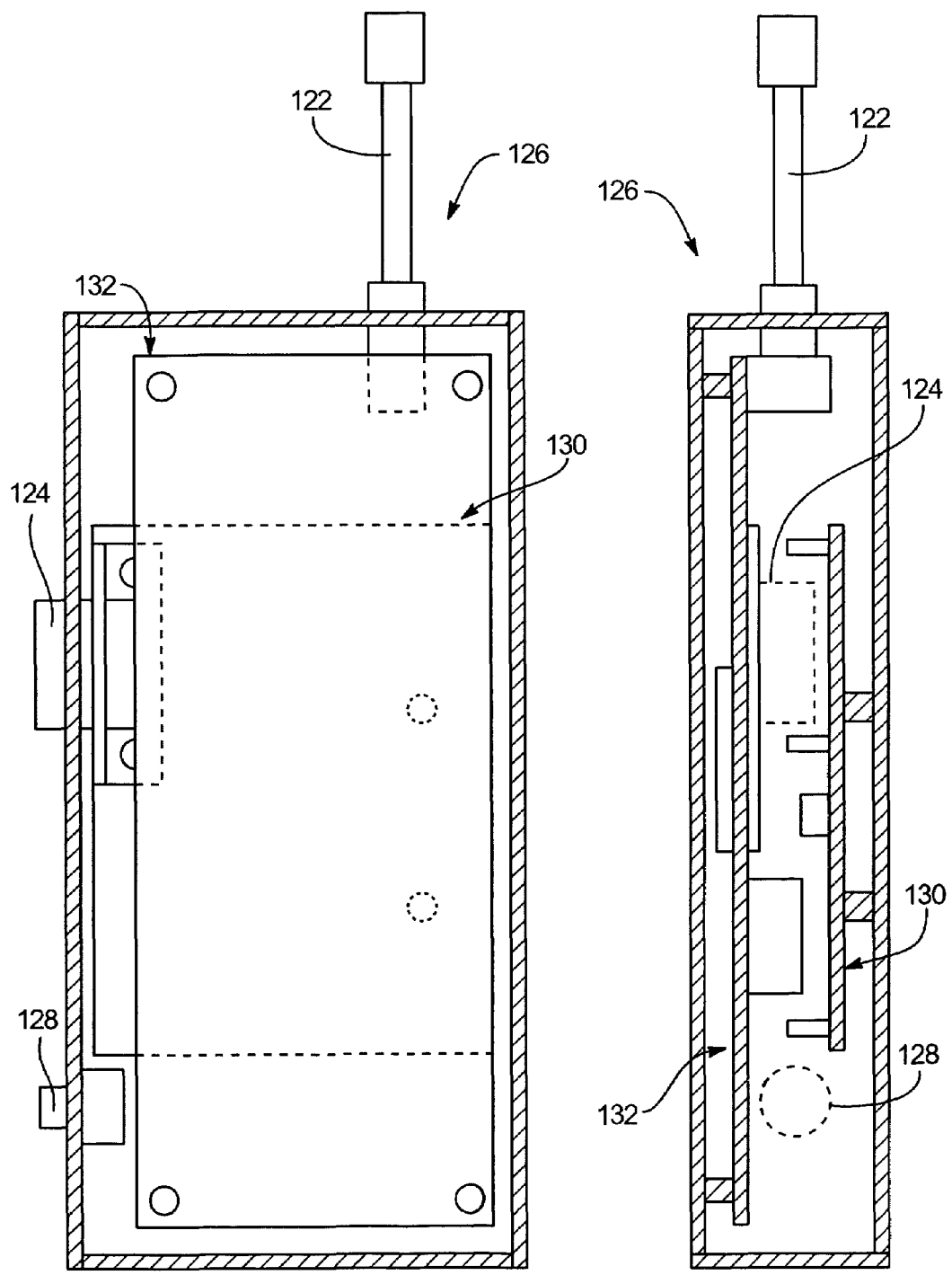
FIG. 11  FIG. 12

ELECTRONIC DEVICE THAT USES A PAGER NETWORK FOR REMOTE REPROGRAMMING OF THE DEVICE

TECHNICAL FIELD

This invention relates generally to computer technology, and is more particularly directed toward systems and methods for reprogramming electronic devices through a pager network.

BACKGROUND

In recent years there has been a great increase in the amount of computer technology that is involved in daily life. In today's world, computer technology is involved in many aspects of a person's day. Many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

The small computers, (which can be rather large computers depending on the particular need which is being met by the computer), almost always have one or more processors at the heart of the computer. The processor(s) usually are interconnected to different external inputs and outputs and function to manage the particular device. For example, a processor in a vending machine for soda pop may be connected to the buttons used to select the pop, to the switch that allows a pop to drop down to a user, and to lights to indicate that the machine does not have any more pop of a particular variety.

Computer technology is involved in many aspects of daily life. Many appliances, devices, etc., include one or more small computers. For example, refrigerators, telephones, typewriters, automobiles, vending machines, and many different types of industrial equipment usually have small computers, or processors, inside of them. Computer software runs the processors of these computers and tells the processors what to do to carry out certain tasks. For example, the computer software running on a processor in a vending machine may cause a soda pop to drop to a user when the correct change has been entered by a user.

These types of small computers that are a part of a device, appliance, tool, etc., are often referred to as embedded systems. The term "embedded system" usually refers to computer hardware and software that is part of a larger system. Embedded systems usually do not have typical input and output devices such as a keyboard, mouse, and/or monitor. Usually, at the heart of each embedded system is one or more processor(s).

SUMMARY AND OBJECTS OF THE INVENTION

It is an object of the present invention to provide systems and methods for reprogramming an electronic device.

A portable electronic device is disclosed that is reprogrammable through a pager network. The device includes a communications port. The device also includes a data transceiver for transmitting send data and receiving receive data from a pager network. In addition, the device has a processor. The processor is in electronic communication with the communications port for communicating through the communications port. The processor is also in electronic communication with the data transceiver for communications with the pager network. The device also includes reprogrammable memory programmed with instructions to cause the device to receive new program code from the pager network and to reprogram the reprogrammable memory with the new program code.

Embodiments of the communications port may include a serial communications port for electronically connecting the device to another electronic device.

The device may be a handheld device that is enclosed in a plastic snap-fit enclosure.

In some embodiments, the device may include a single-board computer. The single board computer may include the processor and the memory. In addition, the single-board computer and the data transceiver may be in electronic communication through a serial connection.

In certain embodiments, the single board computer may include a microcontroller that includes the processor, RAM and flash memory. Instructions may be stored in the flash memory to cause the single-board computer to receive new program code from the pager network through the data transceiver board and to reprogram the flash memory with the new program code such that once reprogrammed the device has new functionality.

A serial communications port may also be included on the single-board computer for electronically connecting the device to another electronic device. Moreover, a serial transceiver may also be included on the single-board computer for use with the serial communications port. The microcontroller may be in electronic communication with the serial communications port through the serial transceiver for communicating with the other electronic device.

Embodiments may also include single-board computer having a serial connection for electronically connecting the single-board computer to the data transceiver board such that the microcontroller is in electronic communication with the data transceiver for communications with the pager network.

A method is disclosed for reprogramming an electronic device through use of a pager network. The method includes providing an electronic device and providing power to the electronic device. Communication is established with the pager network. In addition, the method includes receiving receive data from the pager network that includes new instructions and storing the new instructions in the flash memory of the device thereby reprogramming the device to add new capability to the electronic device.

The portable electronic device may include the functional elements of means for processing, means for storing data, means for communicating with the pager network and means for causing the device to receive new program code from the pager network through the means for communicating with the pager network and to reprogram the means for storing data with the new program code to give the device new functionality.

BRIEF DESCRIPTION OF THE DRAWINGS

The foregoing and other objects and features of the present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

FIG. 11 is a top cross-sectional view of an embodiment of a communications adapter; and FIG. 12 is a side cross-sectional view of an embodiment of a communications adapter.

DETAILED DESCRIPTION

It will be readily understood that the components of the present invention, as generally described and illustrated in the Figures herein, could be arranged and designed in a wide variety of different configurations. Thus, the following more detailed description of the embodiments of the system and method of the present invention, as represented in the Figures, is not intended to limit the scope of the invention, as claimed, but is merely representative of the presently preferred embodiments of the invention.

The presently preferred embodiments of the invention will be best understood by reference to the drawings, wherein like parts are designated by like numerals throughout.

Figure 1:
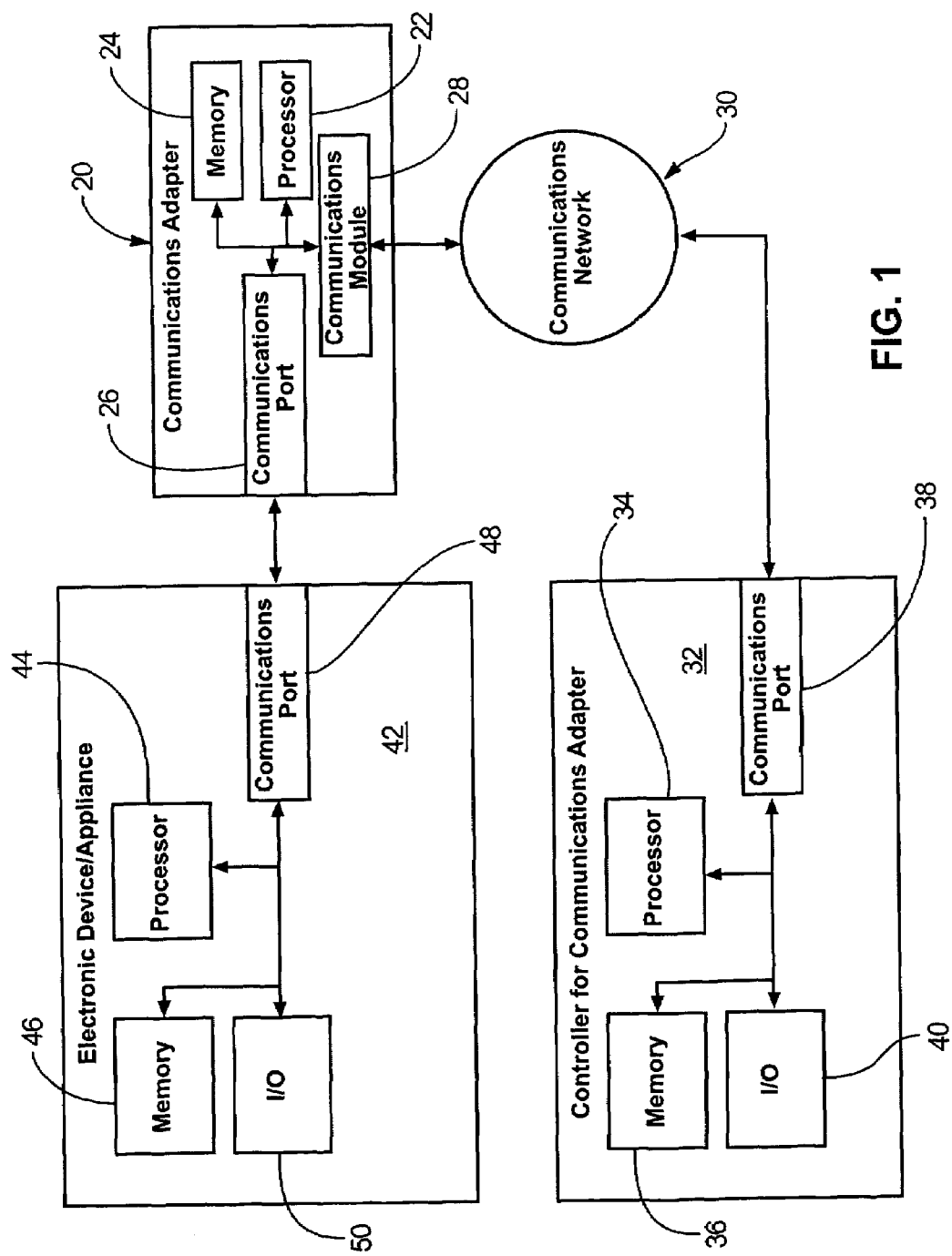
FIG. 1 is a block diagram of hardware components included in an embodiment.

FIG. 1 is a block diagram of hardware components included in an embodiment. An embodiment of a communications adapter 20 includes a processor 22 and memory 24. The communications adapter 20 is an electronic device. For clarity, the adapter 20 will be referred to as the adapter 20 throughout this disclosure, but it will be appreciated by those skilled in the art that the adapter 20 is an electronic device. Those skilled in the art will appreciate the various types of processors and memory that can be used in the communications adapter 20. For example, an embodiment of the communications adapter 20 may include a single-board computer that includes the processor 22 and memory 24. Such single-board computers are commercially available. For example, some embodiments of a communications adapter 20 may use an SDK board commercially available from emWare, Inc. that includes both the processor 22 and the memory 24. Embodiments may include flash memory.

The communications adapter 20 also includes a communications port 26 and a communications module 28. The communications port 26 enables communication with the electronic device. Those skilled in the art will appreciate the various types of communication ports that can be used with the embodiments herein.

The communications module 28 enables communication with a provider computer through a communications network. Depending upon the type of communications network being utilized, the particular embodiment of a communications module may vary. For example, if a pager network were being used as the communications network, a pager communications module may be used with the communications adapter 20. One such commercially available pager communications module is the CreataLink 2 XT transceiver module available from Motorola, Inc.

The communications network 30 is any communications network capable of facilitating communications between the communications adapter 20 and the provider computer. For example, the communications network 30 may be a pager network, a cellular network, a global communications network, the Internet, a computer network, a telephone network, etc. Those skilled in the art will appreciate the many different communications networks 30 that may be utilized with embodiments herein.

The provider computer 32, or the controller 32 for the communications adapter, is capable of communicating over the communications network 30. The controller computer 32 includes a processor 34, memory 36, a communications port 38 as well as other input/output components 40. The controller computer 32 may be a conventional desktop computer. However, it will be appreciated by those skilled in the art that the controller computer 32 is a broadly defined digital computer. A computer, as used herein, is any device that includes a digital processor capable of receiving and processing data. A computer includes the broad range of digital computers including microcontrollers, hand-held computers, personal computers, servers, mainframes, supercomputers, and any variation or related device thereof. In current design, the controller computer 32 is typically an IBM-compatible personal computer running the Linux or Microsoft Windows 95/98/2000 or NT operating system.

The electronic device/appliance 42 is any device, appliance, machine, tool, or the like that is capable of receiving and/or sending electronic signals or messages. Examples of devices 42 within the scope of the term device includes a vending machine, a telephone, a door lock, a temperature sensor, a motor, a switch, a light, a printer, a fax machine, a refrigerator, a health monitor, an elevator/escalator, a copier, a scanner, manufacturing equipment, industrial equipment, computer equipment and peripherals, security systems, monitoring equipment, and the like. The device 42 typically includes a processor 44 (often, but not always, a microcontroller), memory 46, and a communications port 48 as well as other input/output components 50.

Figure 2:
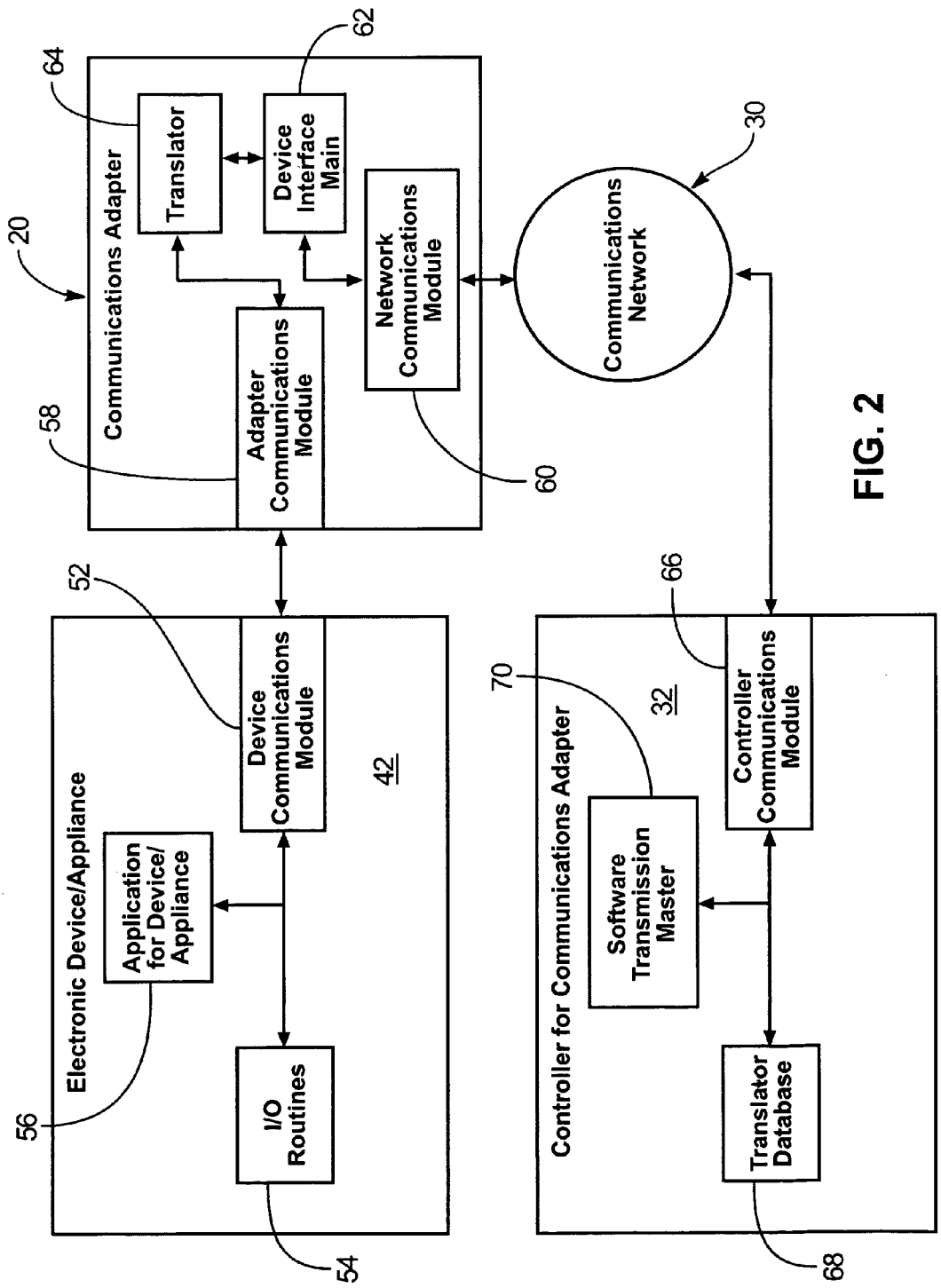
FIG. 2 is a block diagram of software components included in an embodiment.

FIG. 2 is a block diagram of software components included in an embodiment. The electronic device 42 typically includes software to accomplish various tasks including communications, input/output and the monitoring or controlling of the device 42. The device communications module 52 of FIG. 2 represents the computer program routines or instructions that handle the communications over the communications port 48. The I/O routines 54 represent the computer program routines or instructions that handle the input to the device 42 and the output from the device. For example, if there were buttons on the device 42, the I/O routines 54 would include the code necessary to process the inputs from the buttons. The application 56 controls the device and acts as the main program to carry out whatever tasks the device 42 is to carry out. Those skilled in the art will appreciate that the software blocks are only examples and the configuration of blocks shown are not necessary to practice the present embodiments. As explained earlier, many different types of devices 42 are available and can be used with embodiments herein. These devices 42 usually already have the necessary software loaded to run the device 42. Embodiments herein can be used with almost all electronic devices 42 that are capable of electronic communications and have some processing capability.

The communications adapter 20 includes an adapter communications module 58 that represents the computer program routines or instructions that handle the communications over the communications port 26. The network communications module 60 includes the computer program routines or instructions that handle the communications over the communications network 30. If a commercially available communications module 28 is utilized, some or all of the network communications module 60 may also be commercially available.

In the embodiment shown in FIG. 2, the device interface main 62 is the computer program routines or instructions that receive data from and/or send data to the controller 32 via the communications network 30. The device interface main 62 also manages the communications and interactions with the device 42 at the communications adapter 20 by receiving messages from the communications network 30 and by taking appropriate action based on the messages.

The communications adapter 20 may have a translator module 64. In the embodiment shown in FIG. 2, the translator 64 is the computer program routines or instructions that can communicate with, or more fully communicate with, the device 42. Because there are so many different devices 42 being used today there are many different protocols used in communicating with these devices. It may not be feasible to always program the communications adapter with all the necessary code to understand all possible protocols. Accordingly, in the embodiment of FIG. 2 the translator 64 serves to function as an interface between the device 42 and the device interface main 62. The translator may be programmed to send commands to the device 42, to access data on the device 42, to receive commands from the device 42, to control the device 42, to translate messages protocols to/from the device 42, etc. As a result, in certain situations, a new translator 64 being sent to and loaded on the adapter 20 may add new functionality and behavior to the adapter such that an adapter may be reprogrammed to understand new protocols, interfaces, data and/or to interact with a new device 42.

It will be appreciated by those skilled in the art that embodiments herein may be used to reprogram the adapter 20 without any instructions for communicating with the device 42. For example, an adapter 20 may simply be reprogrammed with instructions that do not involve any functionality for communicating with the device 42. If a translator 64 were needed and if an appropriate translator 64 were already on the adapter 20, one may use embodiments herein to update the device interface main 62. Thus, program code can be updated that does not directly or indirectly relate to communicating with another device 42. By way of another example, if the adapter 20 were not connected to a device 42 or did not need any additional functionality to communicate with a connected device 42, program code in the adapter 20 could be updated through the communications network 30. This new program code may not be a translator and may have no communications functionality, but may provide other new functionality. As described, embodiments herein may be used in a broad range of contexts where an adapter or any other electronic device may be reprogrammed via a communications network 30.

An embodiment of the controller computer 32 may include the software components as shown in FIG. 2. A controller communications module 66 includes the computer program routines or instructions that handle the communications over the communications network 30 to and from the adapter 20. A translator database 68 includes one or more translators 64 that can be sent to adapters 20. In the embodiment of FIG. 2, the database 68 includes a plurality of translators 64 such that once the type of electronic device 42 is known, an appropriate translator 64 may be accessed and sent to the adapter 20 through the communications network 30. The software transmission master 70 serves to receive an identification of an electronic device 42 type, to locate a suitable translator 64 and to send the suitable translator 64 to the adapter 20.

Figure 3:
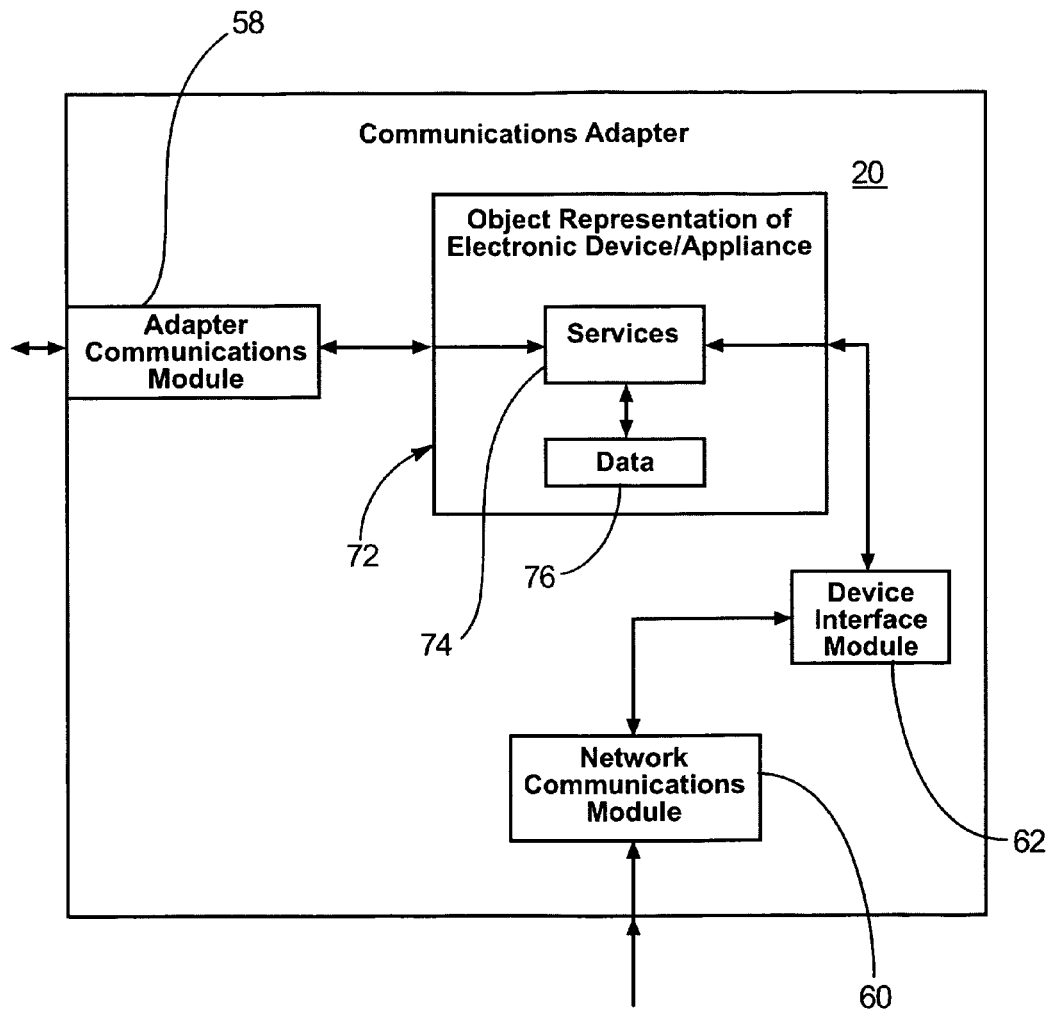
FIG. 3 is a block diagram of software components included in an embodiment of a communications adapter.

FIG. 3 is a block diagram of software components included in an embodiment of a communications adapter. In the embodiment of FIG. 3 the device interface module 62 communicates with the device 42 through an object representation 72 of the device 42. Those skilled in the art will appreciate that various object-oriented methodologies and programming languages can be used to create program code including one or more object representations 72 of the device 42. As known in the art, objects include methods or services 74 and data 76. The services 74 may reflect various functions, variables, events, files, data, etc., on the device 42 and may provide access to these items for the device interface module 62. For example, if the device 42 included a light that could be turned on through electronic communications into the communications port 48, the object 72 may include services 74 such as TurnLightOn( ) and TurnLightOff( ) that, when called, sends the appropriate data to the device 42 to cause the light to turn on and off.

Figure 4:
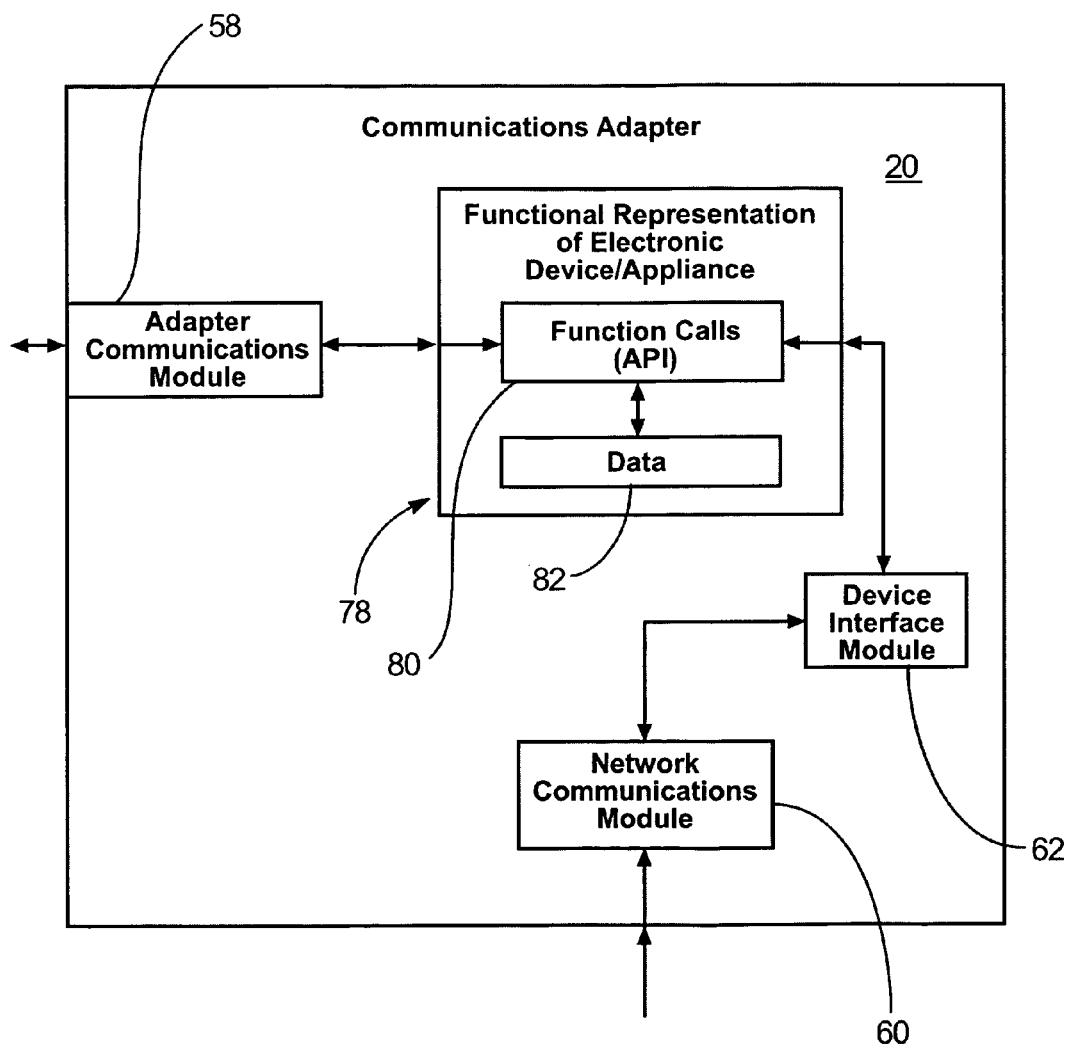
FIG. 4 is a block diagram of software components included in an embodiment of a communications adapter.

FIG. 4 is a block diagram of software components included in an embodiment of a communications adapter. In the embodiment of FIG. 4 the device interface module 62 communicates with the device 42 through a functional representation 78 of the device 42. Those skilled in the art will appreciate that various functional methodologies and programming languages can be used to create program code including one or more functional representations 72 of the device 42. For example, an application programming interface (an "API") may be provided that includes functions 80 and data 82. The functions 80 may reflect various functions, variables, events, files, data, etc. on the device 42 and may provide access to these items for the device interface module 62. Further with the example of the device 42 that included a light that could be turned on through electronic communications into the communications port 48, the API 80 may include functions 80 such as TurnLightOn( ) and TurnLightOff( ) that, when called, sends the appropriate data to the device 42 to cause the light to turn on and off.

FIG. 3 and FIG. 4 assume that the adapter 20 is being updated with new program code that facilitates or enhances communications with the electronic device 42. However, as described earlier, the embodiments and principles herein could be used to reprogram the adapter 20 with new program code that does not include any functionality for communications with another electronic device 42. Accordingly, those skilled in the art will appreciate that FIGS. 3 and 4 only illustrate examples of how the present systems and methods might be used, and those skilled in the art will further appreciate that new program code may be downloaded to add many different capabilities. For example, new program code for power management of the adapter 20, updated program code to fix bugs in the original code, I/O code to handle output to a display on the adapter, and the like, may be downloaded as new program code for the adapter 20.

Figure 5:
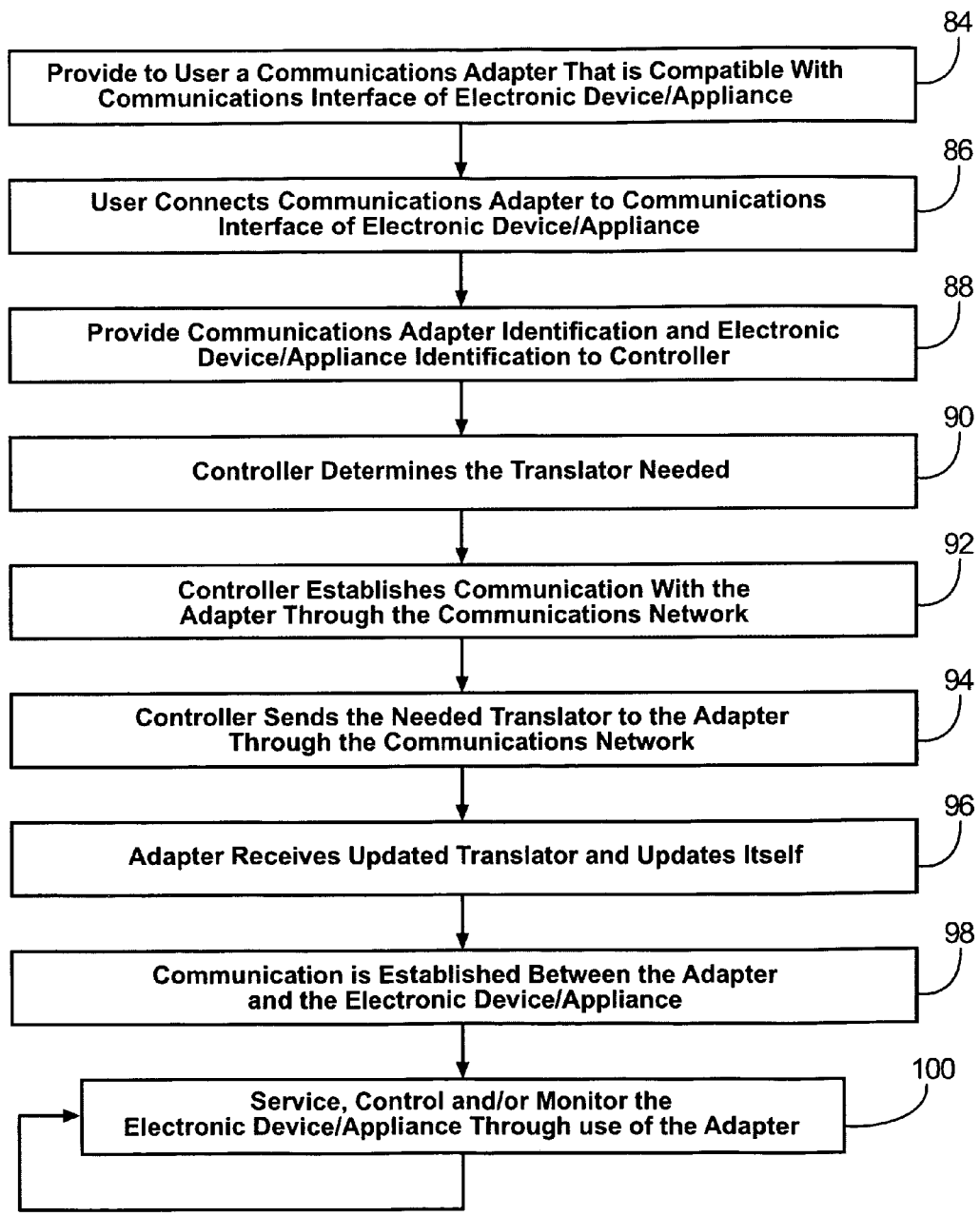
FIG. 5 is a flow diagram of a method for communicating with an electronic device.

FIG. 5 is a flow diagram of a method for communicating with an electronic device 42. One method for communicating with an electronic device 42 with or through an embodiment of a communications adapter 20 includes the act of providing 84 to a user a communications adapter 20 that is compatible with a communications interface of the electronic device 42. The adapter 20 is compatible with the interface so that the adapter 20 can be connected 86 to the electronic device's communication port 48.

Identification for the communications adapter 20 and the type of electronic device 42 are provided 88 to the controller 32. The identification of the adapter 20 enables the controller 32 to send information or data to the adapter 20. If a pager or cellular network were being used with the embodiment, the identification might be a telephone number. If a computer network were being used, the identification might be an IP address, a machine name, or other address. Those skilled in the art will appreciate the type of identification that may be used with an adapter 20. The identification of the device 42 serves to enable the controller 32 to send appropriate computer program code to facilitate communication with the device 42. The computer program code that is sent to the adapter 20 from the controller 32 provides the functionality to communicate with, or more fully communicate with, the electronic device 42. Accordingly, to create such code one skilled in the art would need to know enough about the device 42 or type of device to develop useful program code.

Once the controller receives the electronic device 42 identification, it determines 90 the translator code, or new program code, that may be used on the adapter 20 to communicate with the device 42. The controller 32 then establishes 92 communications with the adapter 20 through the communications network 30. Alternatively, the controller 32 may already be in contact with the adapter 20 such that it does not need to establish communications.

The controller sends 94 the new data, code or instructions to the adapter 20 through the communications network 30. The adapter 20 receives 96 the new data and updates itself. The adapter 20 updates itself by programming its memory or by storing the new data to memory. Those skilled in the art will appreciate how memory may be written to, the various types of memories that can be used, etc.

After the adapter 20 has updated itself, communication is established 98 between the adapter and the electronic device 42. The electronic device 42 is serviced 100 controlled, or monitored through use of the adapter. The updated code provides additional capability and functionality to communicate with the device 42. Through use of this method, functionality and capabilities to service/monitor/control a device 42 may be enhanced without altering the device 42 itself.

Figure 6:
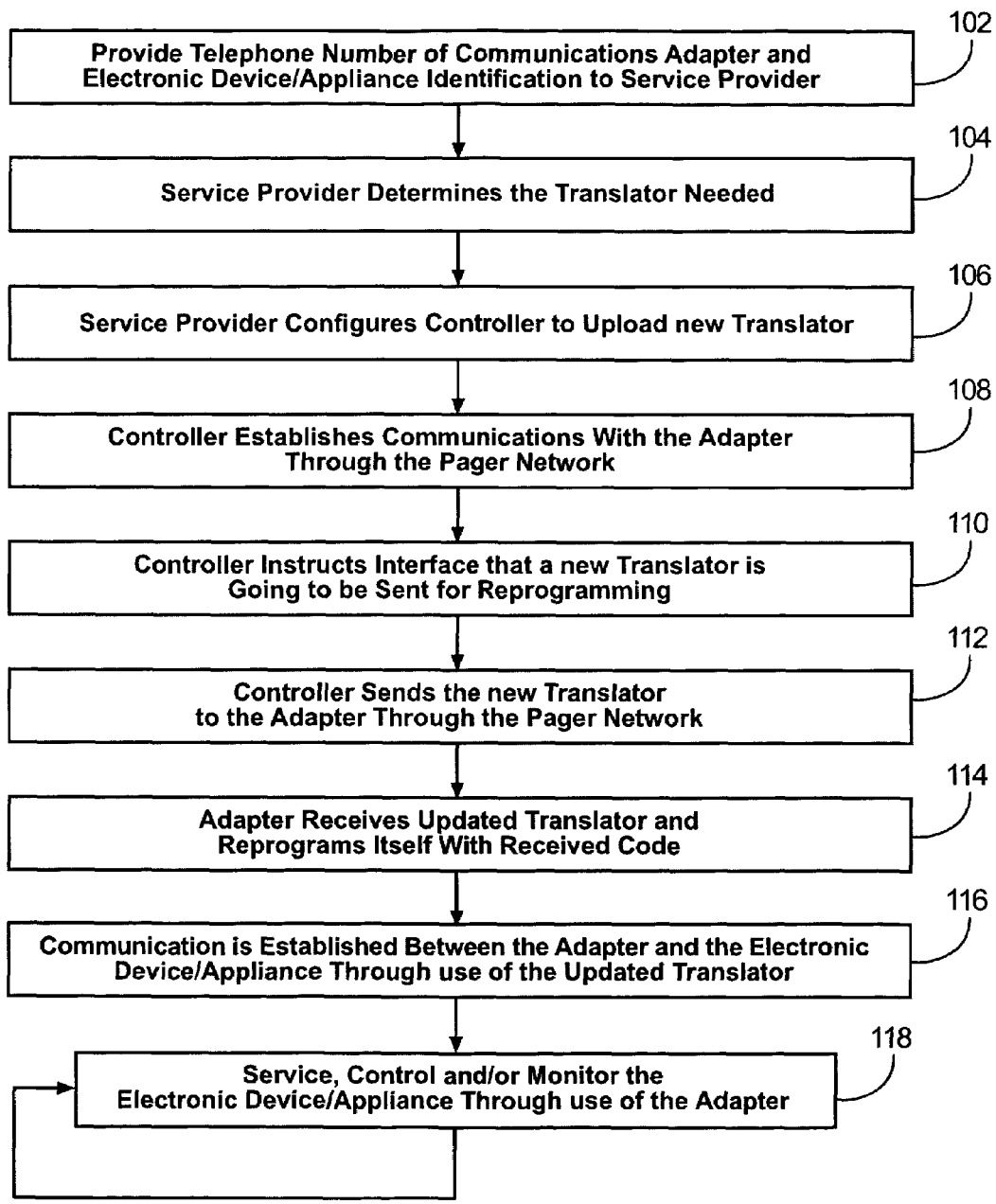
FIG. 6 is a flow diagram of a method for communicating with an electronic device.

FIG. 6 is a flow diagram of a method for communicating with an electronic device. FIG. 6 illustrates an embodiment that uses some manual administration of tasks. In addition, FIG. 6 illustrates the use of a pager network as the communications network 30. Any identifications for the communications adapter 20 and for the electronic device 42 may be automatically acquired and provided to the service provider 32. The identifications may also be manually provided by a user. For example, a user may provide 102 a telephone number of a communications adapter 20 and an identification of the electronic device 42 to the service provider through a telephone call, an email, completing a form on the World Wide Web, etc.

Once the service provider receives the electronic device 42 identification, it determines 104 the translator code, or new program code, that may be used on the adapter 20 to communicate with the device 42. The service provider may then configure 106 the controller 32 to upload the new translator to the adapter 20. The controller 32 then establishes 108 communications with the adapter 20 through a pager network. Alternatively, the controller 32 may already be in contact with the adapter 20 such that it does not need to establish communications.

The controller may instruct 110 the interface main 62 that a translator or a new translator is going to be sent to the adapter 20 so that the adapter 20 may reprogram itself with the new code. The controller sends 112 the new data, code or instructions to the adapter 20 through the pager network. The adapter 20 receives 114 the new data and updates itself. The adapter 20 updates itself by programming its memory or by storing the new data to memory. Those skilled in the art will appreciate how memory may be written to, the various types of memories that can be used, etc.

After the adapter 20 has updated itself, communication is established 116 between the adapter and the electronic device 42. The electronic device 42 is serviced 118 controlled, or monitored through use of the adapter. The updated code provides additional capability and functionality to communicate with the device 42.

Figure 7:
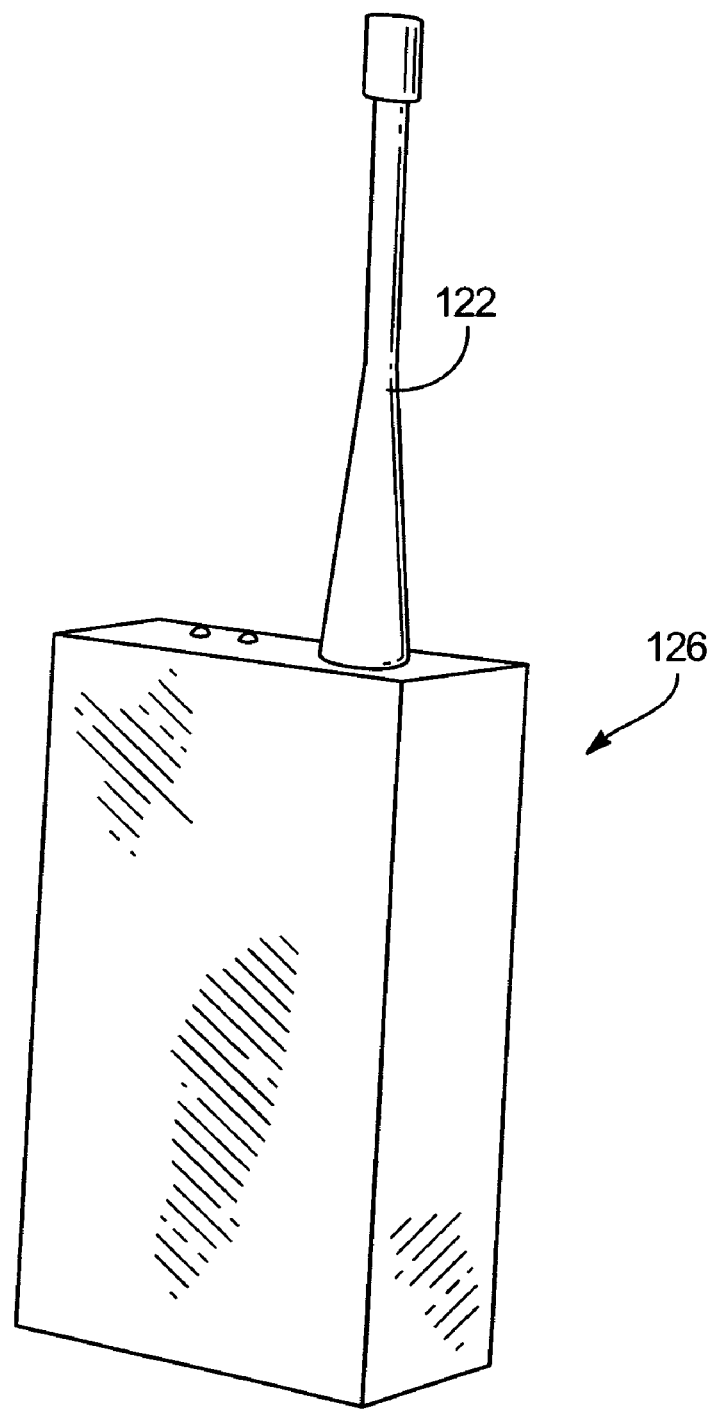
FIG. 7 is a perspective view of an embodiment of a communications adapter.

FIG. 7 is a perspective view of an embodiment of a communications adapter. Those skilled in the art will appreciate that embodiments of a communications adapter may vary widely depending on the specific hardware and software used to achieve a communications adapter. Accordingly, the embodiment of FIGS. 7–12 is only an example of one possible communications adapter. A portable and handheld adapter 126 is shown in FIG. 7. The handheld adapter 126 includes an antenna 122 for a pager module. In the embodiment of FIG. 7, the adapter 126 is enclosed by a plastic snap-fit housing. The snap-fit housing allows the adapter 126 to be opened and closed by hand without the need for any tools. Those skilled in the art will appreciate that many different types of housings or enclosures may be used with an adapter 126 including snap-fit enclosures as well as non-snap-fit enclosures.

Figure 8:
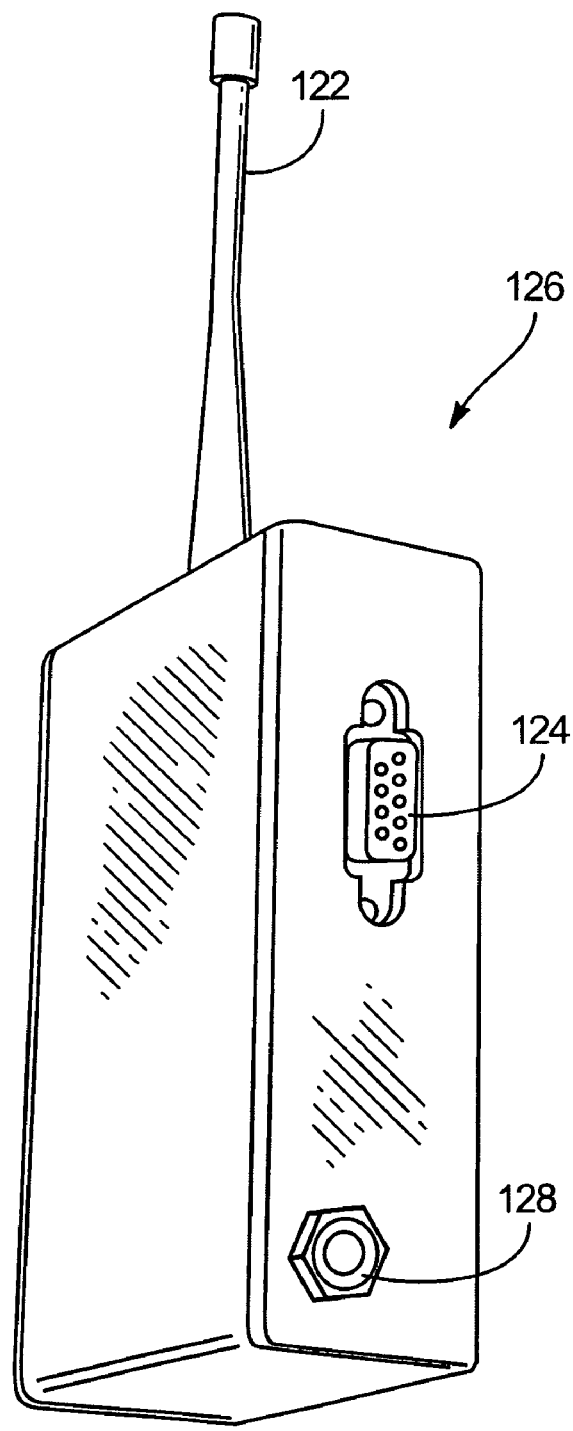
FIG. 8 is a perspective view of an embodiment of a communications adapter.

FIG. 8 is a perspective view of an embodiment of a communications adapter. FIG. 8 illustrates a serial port 124 and a power connector 128. The serial port 124 of FIG. 8 includes a standard DB9 connector. The power connector 128 is also a standard connector used to supply power to electronic devices. Such power connectors, transformers and supporting components are commercially available.

Figure 9:
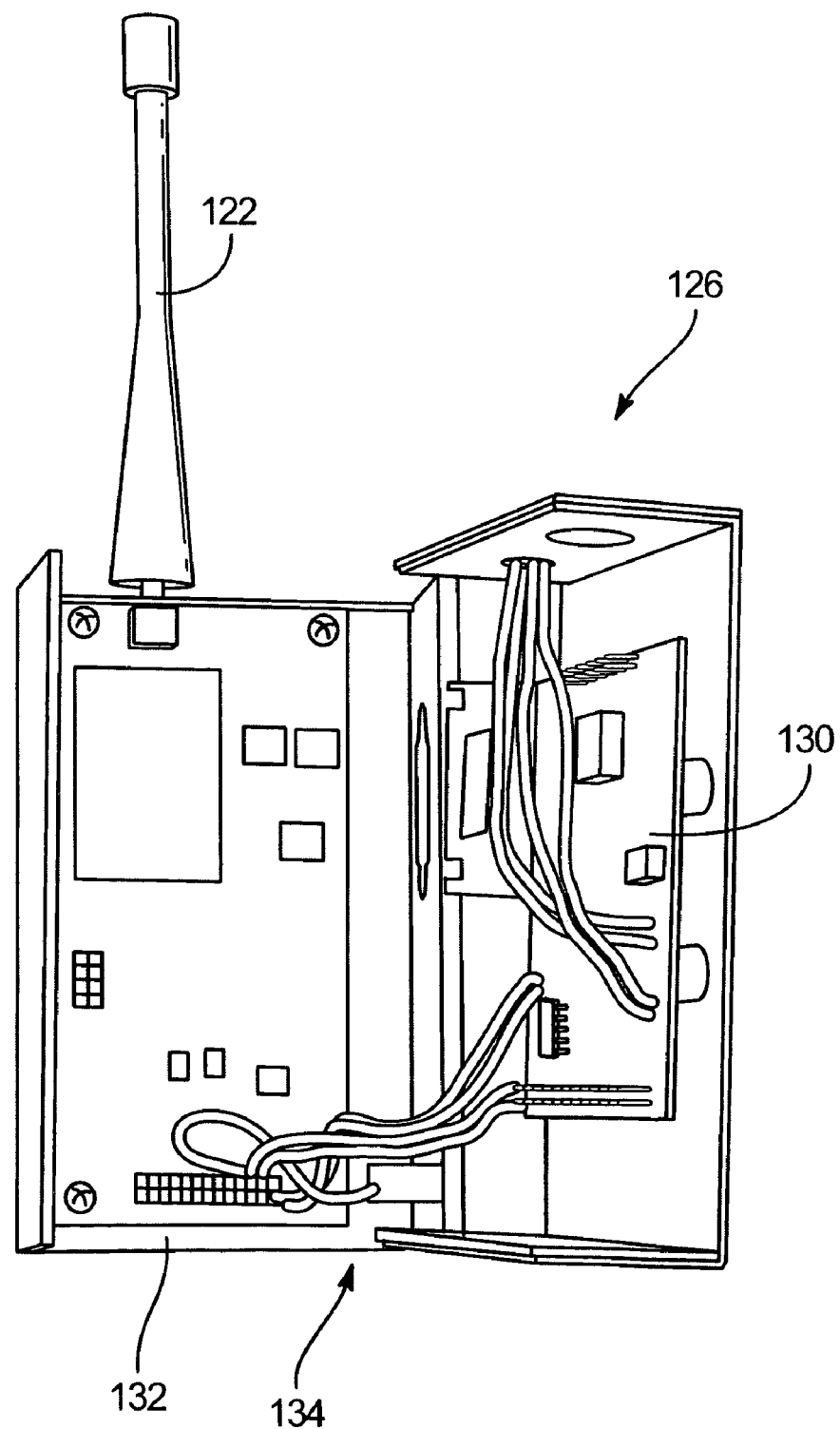
FIG. 9 is a perspective view of an open embodiment of a communications adapter.

FIG. 9 is a perspective view of an open embodiment of a communications adapter. As shown, the handheld adapter 126 may be opened for access to the inner components. The handheld adapter 126 includes a single-board computer 130. The single-board computer 130 of FIG. 9 includes flash memory for reprogramming the functionality of the adapter 126. The single-board computer 130 may include a microcontroller that includes the processor, RAM and the flash memory. The microcontroller may be of any size. In embodiments herein, the microcontroller is typically an 8-bit or 16-bit microcontroller. Further the board 130 may include the serial communications port for electronically connecting the adapter 126 to the electronic device 42. A serial transceiver may also be part of the single-board computer 130 for use with the serial communications port 124. The microcontroller may be in electronic communication with the serial communications port 124 through the serial transceiver for communicating with the electronic device 42. The single-board computer 130 may also include a serial connection for electronically connecting the single-board computer to the data transceiver board such that the microcontroller is in electronic communication with the data transceiver for communications with the communications network.

Figure 10:
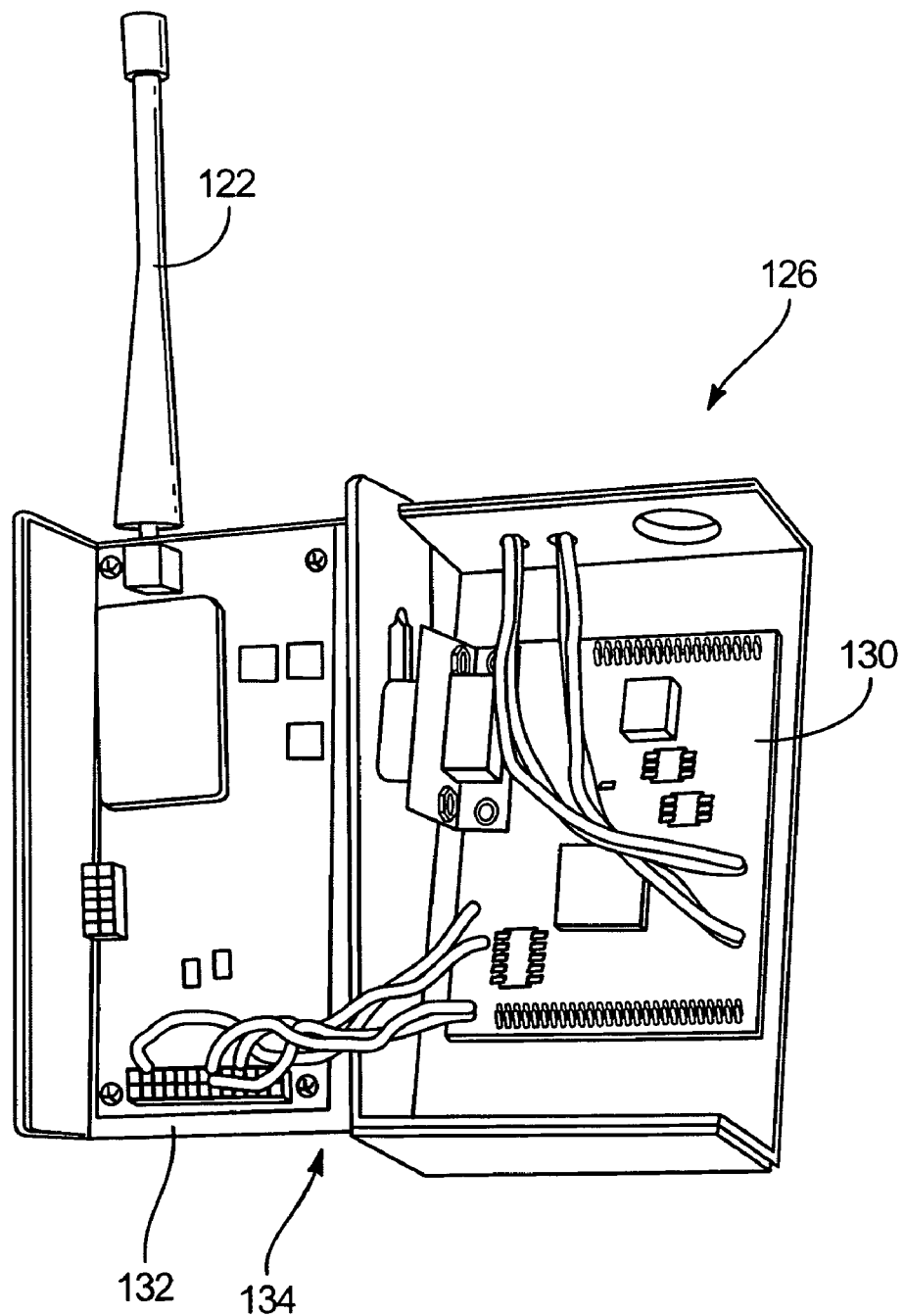
FIG. 10 is a perspective view of an open embodiment of a communications adapter.

The handheld adapter also includes a data transceiver 132. The embodiment of FIG. 9 uses a CreataLink 2 XT module available from Motorola Inc. as the data transceiver 132. As shown, the two boards are connected together by connecting wiring 134. FIG. 10 is another view of the open handheld adapter 126. FIG. 10 illustrates the handheld adapter 126 in a substantially open position.

FIG. 11 is a top cross-sectional view of an embodiment of a communications adapter. More specifically, FIG. 11 illustrates a top cross-sectional view of a handheld adapter 126. This cross-sectional view illustrates the positions of the single-board computer 130 and of the data transceiver 132. In addition, the serial port 124 and power connector 128 are also shown.

FIG. 12 is a side cross-sectional view of an embodiment of a communications adapter. More specifically, FIG. 12 illustrates a side cross-sectional view of a handheld adapter 126. This side cross-sectional view also illustrates the positions of the single-board computer 130 and of the data transceiver 132. In addition, the serial port 124 and power connector 128 are also shown.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A portable electronic device that is reprogrammable through a pager network, the device comprising:
    an external communications port for electronically connecting the electronic device to a first electronic device that is separate and distinct from the electronic device;
    a data transceiver for transmitting send data and receiving receive data from a pager network;
    a processor in electronic communication with the external communications port for communicating through the external communications port with the first electronic device, the processor also being in electronic communication with the data transceiver for communications with the pager network; and
    reprogrammable memory programmed with instructions to cause the device to provide an identification for the electronic device to a controller through the pager network and to receive new program code from the pager network and to reprogram the reprogrammable memory with the new program code for enhancing communications with the first electronic device through the external communications port, wherein the electronic device is reprogrammed and the first electronic device is not reprogrammed.

2. The device as defined in claim 1 wherein the external communications port comprises a serial communications port for electronically connecting the device to another electronic device.

3. The device as defined in claim 1 enclosed in a plastic snap-fit enclosure.

4. The device as defined in claim 1 further comprising a single-board computer, the single board computer including the processor and the memory.

5. The device as defined in claim 4 wherein the single-board computer and the data transceiver are connected by a serial connection.

6. A portable and handheld electronic device capable of communications over a pager network, the device being remotely reprogrammable through the pager network to acquire new functionality:
    a substantially closed housing;
    a data transceiver board for transmitting send data and receiving receive data from a pager network, the data transceiver board located substantially inside the housing;
    an antenna extending from the housing, the antenna being in electronic communication with the data transceiver board;
    a single-board computer the single-board computer being located substantially inside the housing and being substantially parallel with the data transceiver board, the single board computer comprising:
        a microcontroller that includes a processor, RAM and flash memory;
        a serial communications port for electronically connecting the device to a second electronic device, the serial communications port being accessible through a port opening in the housing;
        a serial transceiver for use with the serial communications port, the microcontroller being in electronic communication with the serial communications port through the serial transceiver for communicating with the second electronic device;
        a serial connection for electronically connecting the single-board computer to the data transceiver board such that the microcontroller is in electronic communication with the data transceiver for communications with the pager network; and
        instructions stored in the flash memory to cause the single-board computer to provide an identification for the electronic device to a controller through the pager network and to receive new program code from the pager network through the data transceiver board and to reprogram the flash memory with the new program code for enhancing communications with the second electronic device such that once reprogrammed the device has new functionality for communicating with the second electronic device through the serial communications port, wherein the electronic device is reprogrammed and the second electronic device is not reprogrammed.

7. The device as defined in claim 6 wherein the housing is plastic and snap-fit.

8. The device as defined in claim 6 wherein the microcontroller is a 16-bit microcontroller.

9. The device as defined in claim 6 wherein the microcontroller is an 8-bit microcontroller.

10. A method for reprogramming an electronic device through use of a pager network comprising:
    providing an electronic device comprising:
        an external communications port for electronically connecting the electronic device to a first electronic device that is separate and distinct from the electronic device;

a data transceiver for transmitting send data and receiving receive data from a pager network;

a processor in electronic communication with the external communications port for communicating through the external communications port with the first electronic device, the processor also being in electronic communication with the data transceiver for communications with the pager network; and flash memory;

establishing communications with the pager network;

providing an identification for the electronic device to a controller through the pager network;

receiving receive data from the pager network that includes new instructions for enhancing communications with the first electronic device; and storing the new instructions in the flash memory of the device thereby reprogramming the device to add new capability to the electronic device for communicating with the first electronic device through the external communications port, wherein the electronic device is reprogrammed and the first electronic device is not reprogrammed.

11. The method as defined in claim 10 wherein the external communications port comprises a serial communications port for electronically connecting the device to another electronic device.

12. The method as defined in claim 10 wherein the electronic device is enclosed in a plastic snap-fit enclosure.

13. The method as defined in claim 10 wherein the electronic device further comprises a single-board computer, the single board computer including the processor and the flash memory.

14. The method as defined in claim 13 wherein the single-board computer and the data transceiver are connected by a serial connection.

15. A portable electronic device that is reprogrammable through a pager network, the device comprising:

means for processing;

means for communicating through an external port with a first electronic device that is separate and distinct from the electronic device;

means for storing data;

means for communicating with the pager network;

means for providing an identification for the electronic device to a controller through the pager network; and means for causing the device to receive new program code from the pager network through the means for communicating with the pager network and to reprogram the means for storing data with the new program code to give the device new functionality for communicating with the first electronic device through the means for communicating with the first electronic device, wherein the electronic device is reprogrammed and the first electronic device is not reprogrammed.

16. The device as defined in claim 15 further comprising a plastic snap-fit enclosure.

17. The device as defined in claim 15 further comprising a single-board computer, the single board computer including the means for processing and the means for storing.

18. The device as defined in claim 15 wherein the means for processing comprises a microcontroller.

19. The device as defined in claim 18 wherein the microcontroller is a 16-bit microcontroller.

20. The device as defined in claim 18 wherein the microcontroller is an 8-bit microcontroller.

* * * * *

UNITED STATES PATENT AND TRADEMARK OFFICE
CERTIFICATE OF CORRECTION

PATENT NO. : 6,954,850 B1 Page 1 of 1
DATED : October 11, 2005
INVENTOR(S) : Michael L. Howard et al.

It is certified that error appears in the above-identified patent and that said Letters Patent is hereby corrected as shown below:

Title page,
Item [56], References Cited, U.S. PATENT DOCUMENTS, insert the following:
-- U.S. Patent 6,065,880
   U.S. Patent 5,640,153
   U.S. Patent 5,608,655
   U.S. Patent 5,544,036 --.

Signed and Sealed this

Tenth Day of January, 2006

JON W. DUDAS
*Director of the United States Patent and Trademark Office*